A. E. KISTLER.
RIDING CULTIVATOR.
APPLICATION FILED APR. 5, 1909.
928,769.
Patented July 20, 1909.
2 SHEETS—SHEET 1.
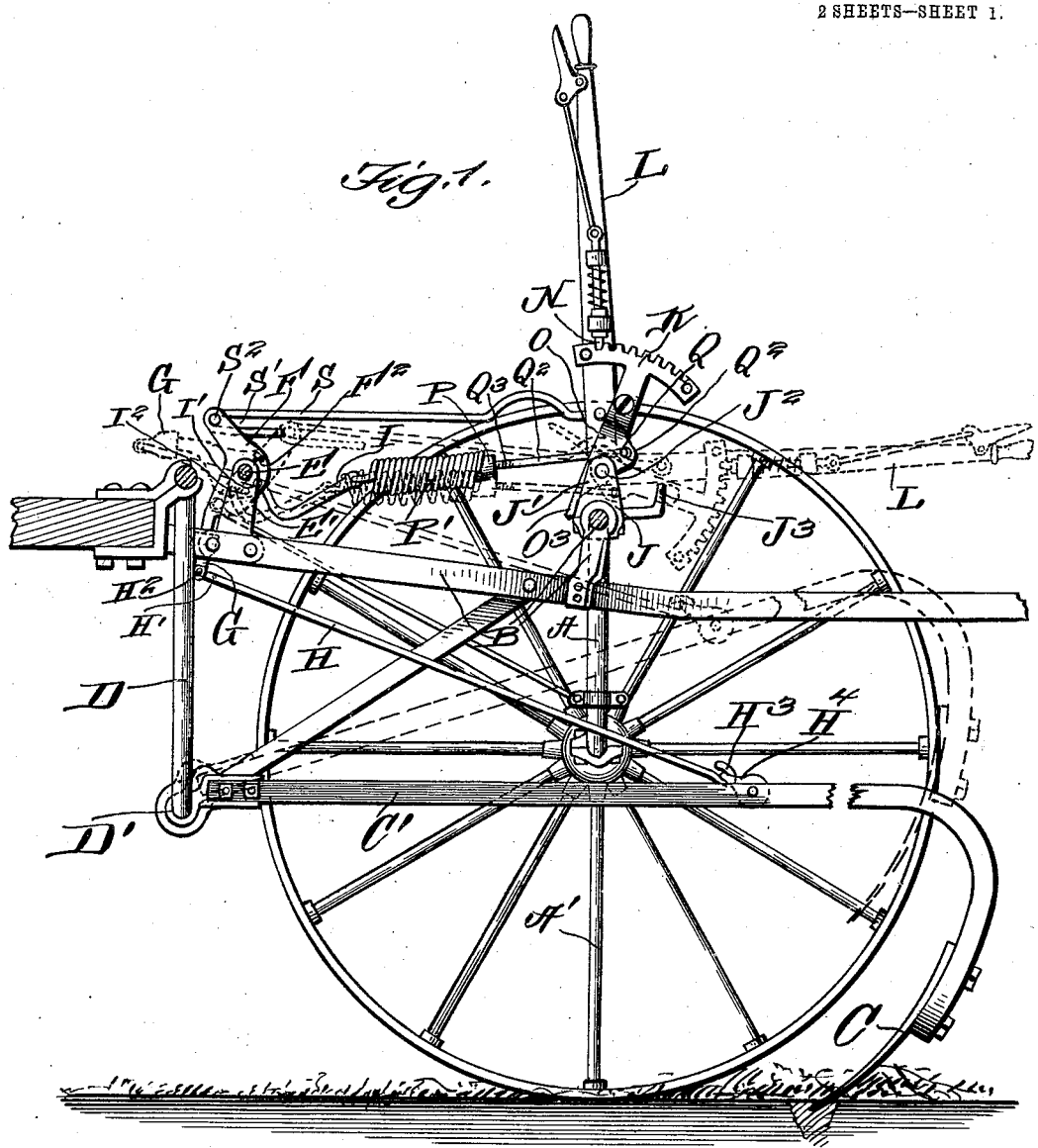

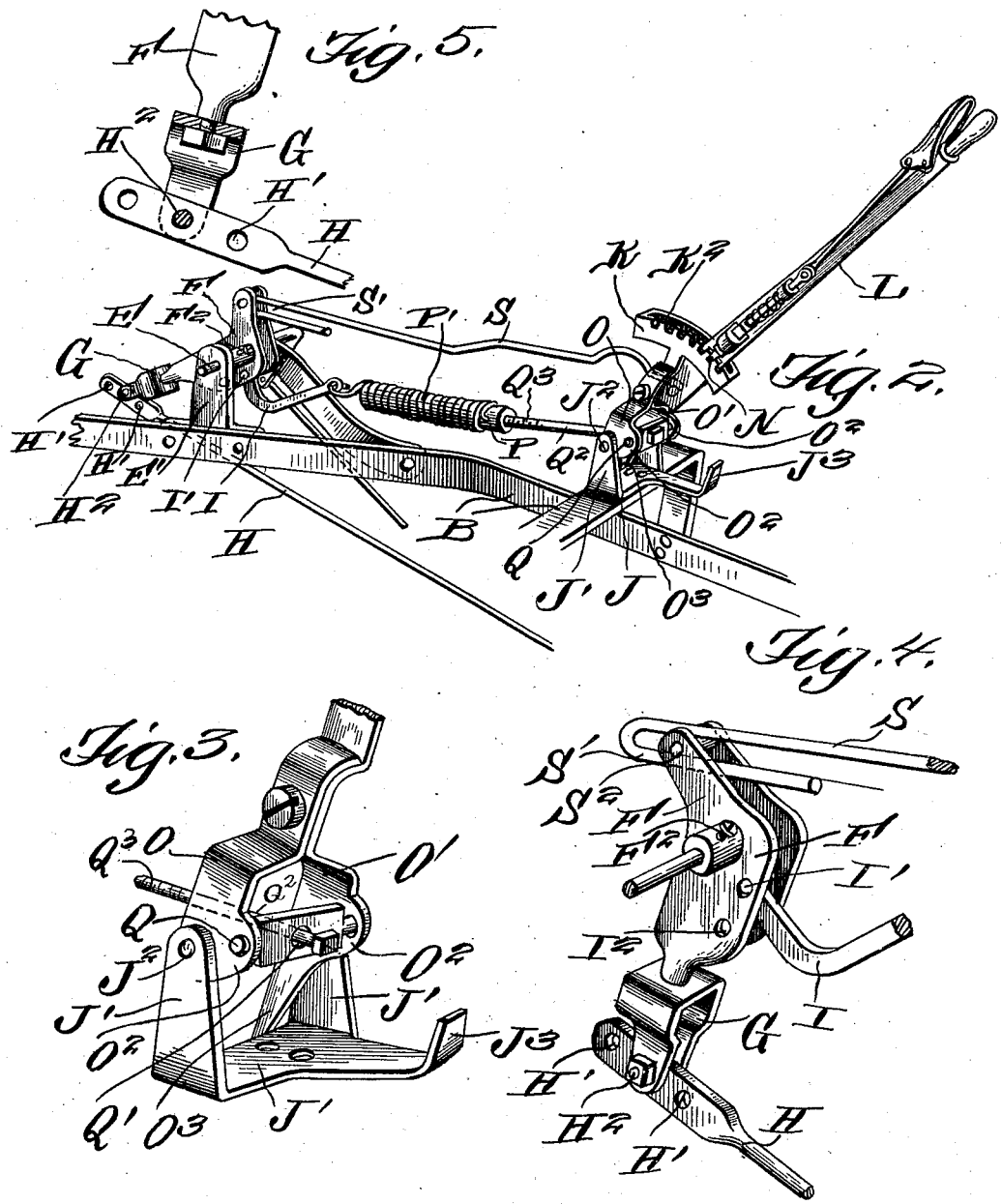

UNITED STATES PATENT OFFICE.

ALPHEUS E. KISTLER, OF CARROLL, OHIO.

RIDING-CULTIVATOR.

No. 928,769.  Specification of Letters Patent.  Patented July 20, 1909.

Application filed April 5, 1909. Serial No. 488,076.

*To all whom it may concern:*

Be it known that I, ALPHEUS E. KISTLER, a citizen of the United States, residing at Carroll, in the county of Fairfield and State of Ohio, have invented certain new and useful Improvements in Riding-Cultivators; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in riding or sulky cultivators and the object in view is to produce a simple and efficient apparatus of this nature so arranged that the gang plows may be adjusted to cut at any depth and the adjusting lever thrown into any position without changing the adjustment of the pawl and still maintaining the uniformity of the adjustment of the cutting depth of the gangs.

The invention consists further in the provision of a riding cultivator so arranged that the gang plows, in the event of their coming into contact with an obstruction, may yield without effecting any of the other parts of the apparatus and return to their normal position after passing the obstruction.

The invention comprises further various other details of construction, combinations and arrangements of parts which will be hereinafter fully described and then specifically defined in the appended claims.

My invention is illustrated in the accompanying drawings, in which:—

Figure 1 is a side elevation of my improved riding cultivator, showing the plows at their lowest throw in solid lines and in raised positions in dotted lines. Fig. 2 is a detailed perspective view of a part of the apparatus for adjusting the depth at which the plows are to cut. Fig. 3 is a detailed perspective view of a part of the apparatus. Fig. 4 is a detailed perspective view showing means for allowing the plows to yield in coming in contact with an obstruction without effecting the other operative parts of the apparatus, and Fig. 5 is a detail sectional view through a swiveled connection.

Reference now being had to the details of the drawings by characters, A designates a drop axle of the cultivator, which is of the usual construction, and upon which the wheels A' are journaled, one of which is shown in Fig. 1 of the drawings, and B designates the frame of the cultivator. A series of gang plows C are fastened to the plow beams C' and each of said plow beams has a bearing aperture for the reception of horizontally disposed apertures D' of the angled bar D which is of the usual construction upon cultivators of this nature.

Mounted upon a rock shaft E, shown in Fig. 2 of the drawings, said shaft being journaled in the lugs E' upon the frame of the apparatus, is a block F, which is adjustably mounted upon the shaft by means of a set screw $F^2$ passing through a collar, as shown clearly in Fig. 4 of the drawings. Said block has swivelly connected thereto a clevis G, and H designates a rod having apertures H' in one end through which a pivot pin $H^2$ passes, said pin being carried by the clevis member G and affording means whereby said rod H may have a longitudinal adjustment. One end of said rod H has a hook $H^3$ which engages an eye $H^4$ fastened to the gang plow beams C', as shown clearly in Fig. 1 of the drawings. Mounted upon said frame is a yoke J having upright arms J' which are apertured to receive the pivot pins $J^2$ and integral with said rack is a projection $J^3$ forming a stop.

A segment rack, designated by letter K, has a shank portion forming two arms O and O' which are pivotally mounted upon the pivot pin $J^2$, and L designates a lever which is pivotally mounted upon one of the pivot pins $J^2$ and has a swinging movement within a slot $K^2$, said movement being limited by the ends of the slot. A spring-pressed pawl N is mounted upon said lever and is adapted to engage one or the other of the notches of said segment rack, as shown clearly in Figs. 1 and 2 of the drawings. Upon reference to Fig. 3 of the drawings, it will be noted that the shank portion of said toothed segment rack has two arms, designated by letters O and O', and said arms have laterally projecting portions $O^2$ which are apertured for the reception of the rock shaft Q which latter is apertured as at Q' for the reception of the bolt $Q^2$ having a threaded portion $Q^3$ designed to engage the nut P which is fastened to the coiled spring P'. A link I is connected to one end of the spring P' and its other end adjustably mounted upon a pivot I' which may be held in one or another of the apertures $I^2$, formed in the walls of the recess in the block F, as shown clearly in Fig. 4 of the drawings. A rod S has one end bent to form an elongated hook S', shown clearly in Fig. 4 of the drawings, and which is adapted to receive a pivot pin S² mounted in the walls of the recess in the block F. The arms O' forming a part of the shaft of the segment rack has a projection O³ adapted to contact with the marginal edge of the horizontally disposed portion of the rack J to limit the swinging movement of the segment rack in one direction, it being understood that the stop J³ serves to limit the throw of the lever in one direction or in the position shown in dotted lines in Fig. 1 of the drawings.

The operation of the apparatus is as follows:—When it is desired to set the gang plows to cut any particular depth, the lever L is swung upon its pivot and the spring-pressed pawl made to engage any particular notch of the segment rack; it being understood that the notch of said rack will serve when the pawl engages the rack to throw the gang plows to cut at different depths. In the event of the gang plows coming in contact with an obstruction of any kind, the tendency would be to cause the gang plows to dig deeper into the ground and such movement will cause a longitudinal movement to be imparted to the bar H which is swiveled to the block F and will cause said block to rock with the shaft upon which it is mounted independent of the rod S, the latter remaining at rest and therefore not effecting the operating lever or any of the operative parts thereof. As said block rocks with its shaft, the spring P' will be put under tension, said tension being regulated by the adjustment of the bolt within said nut P and, after the plow has passed by the obstruction, the recoil of the spring will cause the plow to return to its normal position and continue cutting the uniform depth at which it is set. Should it be desired to cause a greater pressure to be exerted upon the gang plow through the medium of the spring in the event of the plow encountering harder soil, the end of the link I may be adjusted in the forward aperture of the block, thus increasing the tension of the spring, as will be readily understood. By reason of the swiveled connection between the rod H and the clevis, provision is made whereby the gang plows may have a slight lateral play without in any way straining any part of the apparatus.

In the event of it being desired to raise the gang plows from the ground for any purpose and hold the same in such raised positions, it may be done by throwing the lever to the position shown in dotted lines in Fig. 1 of the drawings in which position it will be held by the buckling of the spring P', it being noted that, when the lever is in such position, the pivotal point between the lever and the rod S, the point J² and the point of connection between the rod S and and the block F will be in the same plane, preferably horizontal. In returning the lever L to its normal upright position to lower the gang plows, the moment the point of pivotal connection between the bar S and the lever L comes above the pivotal point J² the spring buckles and the tension of the spring will serve to automatically throw said lever to the position shown in solid lines in Fig. 1. This same automatic action takes place also in throwing the lever down to the position shown in dotted lines, as the spring again buckles when the parts before described approach their horizontal positions. The downward movement of the lever is limited by the edge of the latter coming into contact with the upturned end of the stop J³ forming a projection O³ of the rack J and the swinging movement of the lever in the opposite direction is limited by the projection O³ coming in contact with the opposite edge of the bottom of said rack J. By the provision of the particular means shown clearly in Fig. 3 of the drawings in which the rock shaft through which the bolt Q² passes being mounted in the projecting part of the arms O and O', it will be noted that the spring will be caused to buckle quickly as the bolt is raised above or lowered below the pivotal ends of the rock shaft and it will also be noted that, in whatever position the lever may be positioned, said rock shaft, which is preferably rectangular in cross section, will be held edgewise in a vertical plane.

What I claim to be new is:—

1. A riding cultivator comprising a frame, gang plows pivotally mounted thereon, a rock shaft, a block fixed to said shaft, connections between said block and plows, a segment rack pivotally mounted upon said frame, tension means intermediate said plows and rack, a pivotal lever, a pawl carried by the latter and adapted to engage the teeth of said rack, a rod attached to said lever and having sliding pivotal connections with said plows, as set forth.

2. A riding cultivator comprising a frame, gang plows pivotally mounted thereon, a rock shaft, a block fixed to said shaft, swivel connections between said block and plows, a segment rack pivotally mounted upon said frame, tension means intermediate said plows and rack, a pivotal lever, a pawl carried by the latter and adapted to engage the teeth of said rack, a rod attached to said lever and having sliding pivotal connections with said plows, as set forth.

3. A riding cultivator comprising a frame, gang plows pivotally mounted thereon, a rock shaft, a block fixed to said shaft, a clevis-shaped member swiveled to said block, a bar adjustably connected to said swivel member and adapted to be connected to the gang plows, a segment rack pivotally mounted upon said frame, tension means intermediate said plows and rack, a pivotal lever, a pawl carried by the latter and adapted to engage the teeth of said rack, a rod attached to said lever and having sliding pivotal connections with said plows, as set forth.

4. A riding cultivator comprising a frame, gang plows pivotally mounted thereon, a rock shaft, a block fixed to said shaft, connections between said block and plows, a segment rack pivotally mounted upon said frame, tension means intermediate said plows and rack, a pivotal lever, a pawl carried by the latter and adapted to engage the teeth of said rack, a rod attached to said lever and having sliding pivotal connections with said plows, and means for limiting the swinging movement of said lever, as set forth.

5. A riding cultivator comprising a frame, gang plows pivotally mounted thereon, a rock shaft, a block fixed to said shaft, connections between said block and plows, a segment rack pivotally mounted upon said frame, tension means intermediate said plows and rack, a pivotal lever, a pawl carried by the latter and adapted to engage the teeth of said rack, a rod attached to said lever and having sliding pivotal connections with said plows, a stop against which said lever is adapted to contact to limit its throw in one direction, and a projection upon the segment rack adapted to contact with a portion of the frame to limit the movement of the lever in the opposite direction, as set forth.

6. A riding cultivator comprising a frame, gang plows pivotally mounted thereon, a rock shaft, a block fixed to said shaft, connections between said block and plows, a segment rack pivotally mounted upon said frame, a shaft journaled in the arms forming the shank portion of said rack, a bolt connected to said shaft, a spring, a nut fastened thereto and through which the threaded portion of said bolt passes, connections between the opposite end of said spring and said block, a pivotal lever upon the frame, a rod attached to said lever and having sliding pivotal connection with said block about the shaft upon which it is mounted, a pawl carried by the lever and adapted to engage the teeth of said rack, said lever, as it is swung upon its pivot, designed to cause the spring to buckle as the end of the bolt connected to said shaft rises above or passed beneath the point of pivotal connection of said rack, as set forth.

7. A riding cultivator comprising a frame, gang plows pivotally mounted thereon, a rock shaft, a block fixed to said shaft, connections between said block and plows, a segment rack pivotally mounted upon said frame, the shank portion of said rack having arms with lateral projections which are apertured, a rock shaft journaled in said apertures, a bolt connected to said rock shaft upon the rack, a coiled spring, a nut fixed thereto and through which the threaded portion of said bolt passes, a link connected to the other end of said spring and having pivotal adjustment to said block below the shaft upon which it is mounted, a pivotal lever, a rod attached thereto and having sliding pivotal connection with said block above the shaft upon which it is mounted, a spring-pressed pawl carried by the lever and adapted to engage the teeth of said segment rack, and means for limiting the throw of said lever, as set forth.

8. A riding cultivator comprising a frame, gang plows pivotally mounted thereon, a rock shaft, a block fixed to said shaft, connections between said block and plows, a segment rack pivotally mounted upon said frame, the shank portion of said rack having arms with lateral projections which are apertured, a rock shaft journaled in said apertures, a bolt connected to said rock shaft upon the rack, a coiled spring, a nut fixed thereto and through which the threaded portion of said bolt passes, a link connected to the other end of said spring and having pivotal adjustment to said block below the shaft upon which it is mounted, a pivotal lever, a rod attached at one end thereto and having an elongated hook at its other end, a pin carried by said block and about which the hooked end of said rod passes, a pawl carried by said lever and adapted to engage the teeth of said segment rack, as set forth.

9. A riding cultivator comprising a frame, gang plows pivotally mounted thereon, a rock shaft, a recessed block adjustably mounted upon said shaft, swivel connections between said block and the gang plows, a segment rack pivotally mounted upon the frame, a shaft carried by said segment rack, a bolt passing through said shaft upon the segment rack, a coiled spring, a nut fixed thereto and through which the threaded portion of said bolt passes, a link connected to the other end of said spring and having adjustable pivotal connection with said block below the shaft upon which it is mounted, a pivotal lever, a rod attached thereto and having an elongated hook, a pin carried by said block, said hook positioned in the recess in the block and engaging said pin, and a pawl carried by the lever and engaging the teeth of said segment rack, as set forth.

10. A riding cultivator comprising a frame, gang plows pivotally mounted thereon, a rock shaft, a recessed block adjustably mounted upon said shaft, swivel connections between said block and the gang plows, a yoke fastened to the frame and having upwardly extending arms, a segment rack having a shank portion provided with arms pivotally connected to said upright projections of the yoke, an integral stop upon the latter against which the segment rack is adapted to contact as it moves to its limit in one direction, the projection upon one of the arms of said shaft designed to contact with the frame to limit the movement of the rack in the opposite direction, a shaft seated in projections upon said arms, a bolt passing through an aperture in said shaft upon the rack, a coiled spring, a nut fixed thereto and through which the threaded portion of said bolt passes, a link fixed to one end of the spring and having adjustable connections with said block, a pivotal lever mounted upon one of the projections of said yoke, a rod attached at one end to said lever, a pin upon said block adapted to be engaged by a hook upon said rod, and a spring-pressed pawl mounted upon said lever and adapted to engage the teeth of said segment rack, as set forth.

In testimony whereof I hereunto affix my signature in the presence of two witnesses.

ALPHEUS E. KISTLER.

Witnesses:
- A. L. HOUGH,
- ANNA C. BLAKENEY.